United States Patent [19]

Shutt

[11] 4,265,491
[45] May 5, 1981

[54] MASTER CYLINDER AND SLEEVE FOR CONTROLLING A PROPORTIONING VALVE

[75] Inventor: Paul B. Shutt, St. Joseph, Mich.

[73] Assignee: The Bendix Corporation, Southfield, Mich.

[21] Appl. No.: 81,721

[22] Filed: Oct. 4, 1979

[51] Int. Cl.³ .............................................. B60T 13/00
[52] U.S. Cl. .................................... 303/6 C; 188/345; 303/84 A
[58] Field of Search ............. 303/6 C, 84 A; 188/349, 188/345, 151 A; 60/591, 535, 562, 561, 582

[56] References Cited

U.S. PATENT DOCUMENTS

| 3,686,864 | 8/1972 | Shutt | 303/6 C |
| 3,926,476 | 12/1975 | Mathues | 303/6 C |
| 4,078,384 | 3/1978 | Shutt | 60/591 X |

Primary Examiner—Douglas C. Butler

Attorney, Agent, or Firm—Paul David Schoenle; Terry L. Miller; Ken C. Decker

[57] ABSTRACT

A master cylinder includes a bore communicating with a reservoir and movably receiving a pair of pistons. The pair of pistons cooperate with the housing to substantially form a pair of pressure chambers. An outlet port communicates one of the pressure chambers with a brake circuit and a valve assembly within the outlet port is responsive to the fluid pressure therein to vary communication to the brake circuit. A sleeve within the housing bore movably receives one of the pair of pistons and forms a clearance to communicate the valve assembly with the reservoir independently of the outlet port. The valve assembly is movable in response to a pressure differential between the pair of pressure chambers to close communication between the valve assembly and the reservoir and open communication between the one pressure chamber and the valve assembly independently of the outlet port so as to deactivate the valve assembly. The sleeve also forms an aperture communicating the reservoir with the one pressure chamber.

16 Claims, 2 Drawing Figures

MASTER CYLINDER AND SLEEVE FOR CONTROLLING A PROPORTIONING VALVE

BACKGROUND OF THE INVENTION

A master cylinder includes a housing with a pair of pistons which are movable during a brake application to develop fluid pressure. The pair of pistons cooperate with the housing to substantially form a pair of pressure chambers communicating with respective brake circuits. One of the pressure chambers communicates with its brake circuit via a proportioning valve assembly which is pressure responsive to vary the communiction of fluid pressure to this brake circuit. Generally, the proportioning valve cooperates with the brake circuit associated with the rear wheels to limit pressure buildup therein, as the tilting motion of a vehicle during braking reduces traction to the rear wheels. Such a master cylinder is illustrated generally in U. S. pat. No. 4,078,384.

It is desirable to proportion the communication of fluid pressure to the rear wheels when the fluid pressure developed in the rear brake circuit is above a predetermined value. However, if the front brake circuit should fail for some reason, it is important that some device be provided to prohibit proportioning. This is necessary because the rear brake circuit is the only brake circuit braking the vehicle when the front brake circuit fails, and it is not desirable to reduce brake pressure to the only braking circuit.

SUMMARY OF THE INVENTION

The present invention relates to an improved master cylinder wherein a proportioning valve is deactivated when a front brake circuit fails. The master cylinder includes a housing forming a reservoir and including a bore for movably receiving a pair of pistons. The pair of pistons cooperate with the housing to form a pair of pressure chambers. The pistons move during braking to develop fluid pressure within the pressure chambers which in turn communicate via brake circuits to the front and rear brake assemblies on a vehicle. One of the pressure chambers communicates via a proportioning valve to the rear brake assembly. An outlet port extends from the one pressure chamber to the proportioning valve and an auxiliary passage independent from the outlet port communicates a cavity formed by the proportioning valve with the reservoir. A sleeve movably disposed within the housing bore is responsive to a pressure differential between the pair of pressure chambers to control the operation of the proportioning valve. In a normal or first position the sleeve opens communication between the cavity and the reservoir so that the proportioning valve is free to vary fluid communication to the rear brake assembly. In a second position the sleeve closes communication between the cavity and the reservoir and opens communication between the cavity and one pressure chamber so that the proportioning valve is biased to and maintained in a non-operating position. The sleeve moves to the second position when the other pressure chamber fails to develop a pressure level which is substantially equal to the pressure level developed in the one pressure chamber. The sleeve also defines an inner bore movably receiving one of the pair of pistons and an aperture on the sleeve communicates the reservoir with the one pressure chamber.

It is an object of the present invention to include a sleeve in a master cylinder so that the sleeve is responsive to a pressure differential between a pair of pressure chambers to control the operation of a proportioning valve.

DETAILED DESCRIPTION

Figure 1:
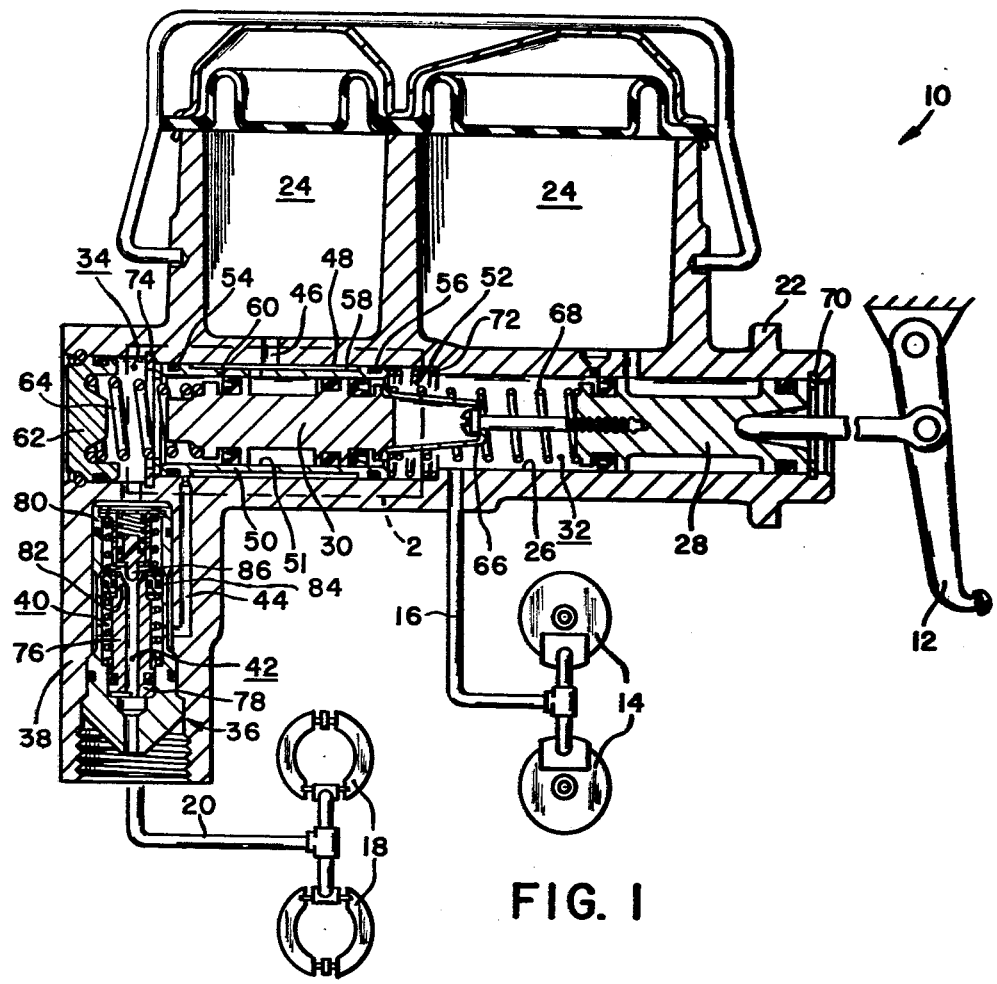
FIG. 1 is a schematic illustration of a brake assembly having a master cylinder constructed in accordance with the present invention illustrated in cross section.
Figure 2:
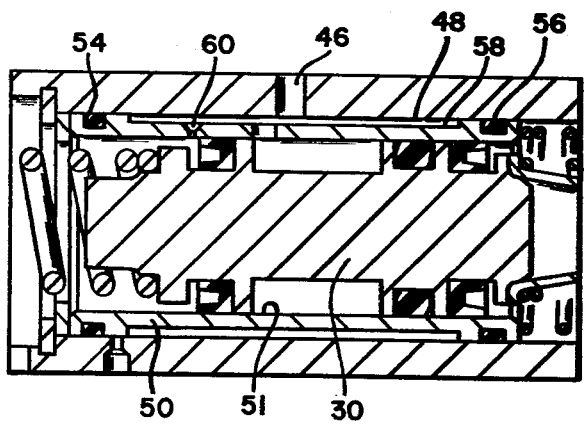
FIG. 2 is an enlarged view of the encircled portion of FIG. 1.

The master cylinder 10 is coupled to a brake pedal 12 so that during braking fluid pressure is communicated to a front brake assembly 14 via circuit 16 and to a rear brake assembly 18 via circuit 20. A housing 22 forms a split reservoir 24 and a stepped bore 26. A pair of pistons 28 and 30 are movably disposed within the bore 26 to substantially form a pair of pressure chambers 32 and 34. The pressure chamber 32 communicates via circuit 16 to brake assembly 14 and the pressure chamber 34 communicates via circuit 20 to brake assembly 18. The brake circuit 20 extends from the chamber 34 to the brake assembly 18 and includes a proportioning valve assembly 36 disposed within a boss 38 extending outwardly from the housing 22. The proportioning valve assembly 36 defines a cavity 40 remote from an outlet passage 42 within the brake circuit 20. An auxiliary passage 44 communicates the cavity 40 with the reservoir 24 via the bore 26 and a port 46.

In accordance with the invention a large diameter portion 48 of bore 26 movably receives a sleeve 50. The sleeve 50 defines an inner bore 51 movably receiving the piston 30 and a spring 52 biases the sleeve to a rest position wherein a sleeve seal 54 is sealingly engaged with the diameter 48 to the left of auxiliary passage 44 and another sleeve seal 56 is sealingly engaged with the diameter 48 to the right of port 46. A recess 58 on the sleeve 50 between the seals 54 and 56 defines a clearance permitting communication between auxiliary passage 44 and port 46 when the sleeve is in the rest position. An aperture 60 on the sleeve 50 communicates the reservoir 24 with the chamber 34 via the recess 58 and port 46.

A plug 62 closes the end of bore 26 adjoining diameter portion 48 and a spring 64 biases piston 30 to a rest position abutting retainer 66, while a spring 68 biases piston 28 to a rest position abutting snap ring 70. The spring 52 abuts a shoulder 72 defined by the stepped bore and biases the sleeve into abutment with a snap ring 74 defining the rest position for the sleeve 50.

The sleeve 50 is exposed to the fluid pressure within chamber 32 by the sleeve portion adjoining spring 52 and extending into chamber 32. Moreover, the sleeve 50 is exposed to the fluid pressure within chamber 34 by the sleeve portion adjoining snap ring 74 and extending into chamber 34. Consequently, if both chambers 32 and 34 are substantially equal in fluid pressure the sleeve remains in the rest position in abutment with snap ring 74. If chamber 32 is vented to atmosphere, as a result of a leak in brake circuit 16, the chamber 34 will contain higher fluid pressure than chamber 32 so that the sleeve 50 will shift to contract spring 52 and close auxiliary passage 44 from reservoir 24, while at the same time opening auxiliary passage 44 to the pressure chamber 34.

The proportioning valve assembly 36 includes a piston 76 having a large diameter portion 78 sealingly engaging a casing 80 and a small diameter portion 82 sealingly and movably engaging a sealing ring 84. The piston 76 is normally spaced from a valve 86 to permit uninhibited communication of fluid pressure from the pressure chamber 34 to the brake assembly 18. When the fluid pressure within chamber 34 reaches a predetermined value the fluid pressure acting across the large diameter portion 78 causes the piston 76 to move toward the valve 86 to throttle fluid communication to the brake assembly 18. As a result, the fluid pressure communicated to brake assembly 18 is less than the fluid pressure communicated to brake assembly 14 when the fluid pressure within chamber 34 is above the predetermined value.

MODE OF OPERATION

During normal operation, the pistons 28 and 30 are movable in response to movement of the pedal 12 to generate fluid pressure within pressure chambers 32 and 34. Fluid pressure within each chamber is communicated to its respective brake circuit 14 or 18 to brake a vehicle. When the fluid pressure within chamber 34 reaches the predetermined value the proportioning valve assembly is operable to restrict fluid communication to the brake assembly 18. Throughout normal operation the sleeve 50 is exposed to substantially equal fluid pressures at each end within pressure chambers 32 and 34. Consequently, the sleeve 50 remains in its rest position to communicate the proportioning valve cavity 40 with the reservoir via auxiliary passage 44, recess 58 and port 46.

If the pressure chamber 32 is vented to atmosphere due to a leak, contraction of the chamber during braking will not generate fluid pressure therein, and the pair of pistons will be moved to generate fluid pressure only in chamber 34. The sleeve 50 will move in response to the pressure differential between the chambers to contract spring 52. In addition, movement of the sleeve 50 toward the shoulder 72 closes communication between the passage 44 and the reservoir 24, and opens communication between the passage 44 and the chamber 34 to communicate the latter with cavity 40. Fluid pressure within the cavity 40 substantially offsets the fluid pressure within passage 42 acting against piston 76 and biasing the latter toward valve 86. Consequently, the piston 76 will not move toward the valve 86 so that no restriction of fluid pressure to brake assembly 18 will occur when the sleeve is moved to open the passage 44 to the pressure chamber 34.

When the leak is repaired, so that contraction of chamber 32 will generate fluid pressure therein substantially equal to the fluid pressure within chamber 34, the sleeve 50 will return to its rest position to communicate passage 44 and cavity 40 with reservoir 24.

Although the boss 38 carrying proportioning valve assembly 36 is orientated opposite the brake circuit 16, it is feasible to orientate the boss and brake circuit 20 in any direction relative to the brake circuit 16.

Viewing the Figure, an optional warning and reset switch assembly 90 is illustrated, however this assembly is not a part of the present invention and is only included as a matter of interest.

I claim:

1. A master cylinder comprising a housing defining a reservoir, said housing furter defining a bore for movably receiving a pair of pistons, the pair of pistons cooperating with the housing to substantially define a pair of pressure chambers communicating with brake circuits, one of the pair of pressure chambers communicating with a valve assembly, said valve assembly being responsive to a predetermined pressure level within said one pressure chamber to vary fluid communication from the one pressure chamber to one of the brake circuits, said valve assembly also communication with said reservoir, and a sleeve slidably and sealingly engaging said housing, said sleeve having a bore sealingly and slidably receiving one of the pair of pistons, said sleeve being movable in response to a pressure differential between the pair of pressure chambers to close said communication of said valve assembly with said reservoir so as to deactivate the valve assembly.

2. The master cylinder of claim 1 in which the valve assembly is disposed within an outlet on the housing, the valve assembly including a pair of seals defining a cavity therebetween, and said sleeve cooperating with the housing bore to define a passage communicating the cavity with the reservoir, said passage providing for said communication of said valve assembly with said reservoir.

3. The master cylinder of claim 2 in which the cavity is normally in communication with the reservoir via said passge and said sleeve is movable in response to the pressure differential between the pair of pressure chambers to close communication between the cavity and the reservoir.

4. The master cylinder of claim 1 in which said sleeve includes an aperture normally communicating the one pressure chamber with the reservoir.

5. The master cylinder of claim 1 in which the housing bore defines a first diameter portion movably receiving said sleeve and a second diameter portion movably receiving the other piston, and said sleeve bore including a diameter substantially equal to the diameter of the second diameter portion.

6. The master cylinder of claim 5 in which the first diameter portion cooperates with the second diameter portion to define a shoulder therebetween and a spring extending from the shoulder to said sleeve biases the latter to a rest position.

7. In a master cylinder having a housing defining a reservoir and a bore communicating with the reservoir, a pair of pistons movably disposed within the bore and cooperating with the housing to substantially define a pair of pressure chambers communicating with respective brake circuits, one of the pressure chambers communicating with its respective brake circuit via a valve assembly which is responsive to a predetermined pressure level within said one pressure chamber to vary the communication from the one pressure chamber, characterized by a sleeve slidably received in said bore and slidably receiving one of said pistons, said sleeve being responsive to a pressure differential between the pair of pressure chambers to move from a rest position to a bypass position, said sleeve in the rest position providing for normal actuation of the valve assembly and said sleeve in the bypass position providing for communication of fluid pressure from said one pressure chamber to said valve assembly and preventing actuation of the valve assembly.

8. The master cylinder of claim 7 in which the housing defines a passage leading to the valve assembly, said sleeve in the rest position opening communication between the passage and the reservoir, and said sleeve in the bypass position opening communication between the passage and the one pressure chamber.

9. The master cylinder of claim 7 in which said sleeve extends from the one pressure chamber to the other pressure chamber and defines a bore for movably receiving one of the pistons.

10. In a master cylinder having a housing defining a reservoir and a bore communicating with the reservoir, at least one piston movably disposed within the bore and cooperating with the housing to substantially define a pressure chamber communicating with a brake circuit, and a valve assembly upstream of the brake circuit and responsive to the fluid pressure within the pressure chamber to vary fluid communication from the pressure chamber to the brake circuit, characterized by a sleeve movably disposed within the housing bore and including a bore for receiving the one piston, the housing defining a passage communicating the valve assembly with the reservoir, said sleeve being biased to a first position normally opening communication between the valve assembly and the reservoir, and said sleeve being responsive to the fluid pressure within the pressure chamber to move to a second position closing communication between the valve assembly and the reservoir.

11. The master cylinder of claim 10 in which said sleeve defines an aperture normally communicating the reservoir with the pressure chamber when the one piston is in a rest position.

12. In a master cylinder, a housing with a bore movably receiving a pair of pistons, the pair of pistons cooperating with the housing to substantially define a pair of pressure chambers, and housing defining an outlet port communicating with one of said pressure chambers, a valve assembly disposed within the outlet port and responsive to fluid pressure therein to vary fluid communication through the outlet port, a feedback passage extending from the valve assembly to the housing bore independently of the outlet port, and a sleeve cooperating with the housing bore to define a clearance normally communicating the feedback passage with a reservoir formed by the housing, said sleeve being movable in response to a pressure differential between the pair of pressure chambers to close communication between the feedback passage and the reservoir.

13. The master cylinder of claim 12 in which said sleeve is movable to open communication between the feedback passage and the one pressure chamber.

14. The master cylinder of claim 13 in which the valve assembly is normally maintained in an operative condition when the feedback passage is open to the reservoir and the valve assembly is prevented from operating when the feedback passage is open to the one pressure chamber.

15. The master cylinder of claim 12 in which said sleeve in a rest position sealingly engages the housing bore at a first location between the outlet and feedback passages and at a second location within the other pressure chamber.

16. The master cylinder of claim 12 in which one of the pair of pistons is movable relative to said sleeve during a brake application and said sleeve is movable relative to the housing bore when a predetermined pressure differential exists between the pair of pressure hambers.

* * * * *